United States Patent [19]

Douglas

[11] Patent Number: 5,537,635
[45] Date of Patent: Jul. 16, 1996

[54] METHOD AND SYSTEM FOR ASSIGNMENT OF RECLAIM VECTORS IN A PARTITIONED CACHE WITH A VIRTUAL MINIMUM PARTITION SIZE

[75] Inventor: Daniel G. Douglas, San Jose, Calif.

[73] Assignee: International Business Machines Corporation, Armonk, N.Y.

[21] Appl. No.: 222,219

[22] Filed: Apr. 4, 1994

[51] Int. Cl.[6] .................................................. G06F 12/02
[52] U.S. Cl. ........................ 395/456; 395/463; 395/853; 364/DIG. 1
[58] Field of Search ................................... 395/463, 853, 395/250, 456, 497.04; 364/DIG. 1

[56] References Cited

U.S. PATENT DOCUMENTS

| | | | |
|---|---|---|---|
| 4,463,424 | 7/1994 | Mattson et al. | 395/463 |
| 4,489,378 | 12/1984 | Dixon et al. | 395/853 |
| 4,603,382 | 7/1986 | Cole et al. | 395/250 |
| 4,754,394 | 6/1988 | Brantley, Jr. et al. | 395/405 |
| 4,926,323 | 5/1990 | Baror et al. | 395/375 |
| 4,980,822 | 12/1990 | Brantley, Jr. et al. | 395/412 |
| 5,138,705 | 8/1992 | Lo et al. | 395/402 |
| 5,285,527 | 2/1994 | Crick et al. | 395/445 |
| 5,394,531 | 2/1995 | Smith | 395/463 |
| 5,434,992 | 7/1995 | Mattson | 395/446 |
| 5,457,793 | 10/1995 | Elko et al. | 395/600 |

Primary Examiner—Reba I. Elmore
Assistant Examiner—James Peikari
Attorney, Agent, or Firm—Esther E. Klein; Craig J. Yudell; Andrew J. Dillon

[57] ABSTRACT

A method for avoiding a cache-full condition in an LRU organized, data set partitioned, page oriented cache of a defined capacity intercoupling a processor to an external storage subsystem is provided. The processor is capable of storing pages of a data set into a plurality of cache partitions. The method comprises the steps of periodically determining the target size of each partition for optimal partitioning, and assigning a reclaim vector to each partition specifying the number of frames to be stolen from each of the other partitions necessary to achieve the corresponding target size. If the target size of a particular partition is less than the partition's virtual minimum size, the method adjusts that partition's reclaim vector to enable the partition to steal sufficient frames from other partitions to achieve the virtual minimum size. In response to a cache miss, frames are stolen from other partitions, as directed by the reclaim vector of the partition storing the data set to which the missing page reference is a member, by removing the lowest page in LRU order and adding the resulting frame to the storing partition and modifying the storing partition's reclaim vector.

15 Claims, 4 Drawing Sheets

Table 1. Reclaim vector example

| Interval | | 1 | | 2 | | 3 | | 4 | |
|---|---|---|---|---|---|---|---|---|---|
| | | \multicolumn{8}{c}{Partition Data} |
| 1 | current size | 25000 | target size 43000 | 25000 | 20000 | 25000 | 27000 | 25000 | 10000 |
| 1 | reclaim vector | (0 4500 0 13500) | | < | | (0 500 0 1500) | | < | |
| 2 | current size | 43000 | 40000 | 20000 | 30000 | 27000 | 29250 | 10000 | 750 |
| 2 | reclaim vector | < | | (2448 0 0 7552) | | (552 0 0 1698) | | (0 205 45 0) | |
| 3 | current size | 40000 | 40250 | 30000 | 39000 | 29250 | 20000 | 750 | 750 |
| 3 | reclaim vector | (0 0 250 0) | | (0 0 9000 0) | | < | | (6 244 0 0) | |
| 4 | current size | 32000 | 35000 | 30000 | 35100 | 37250 | 29000 | 750 | 900 |
| 4 | reclaim vector | (0 0 3000 0) | | (0 0 5100 0) | | < | | (37 63 150 0) | |
| 5 | current size | 30000 | 33000 | 40000 | 33000 | 29100 | 34000 | 900 | 0 |
| 5 | reclaim vector | (0 2659 0 341) | | < | | (0 4341 0 559) | | (379 0 621 0) | |
| 6 | current size | 33000 | 49000 | 33000 | 500 | 33500 | 50500 | 500 | 0 |
| 6 | reclaim vector | (0 15758 0 242) | | (242 0 258 0) | | (0 16742 0 258) | | (484 0 516 0) | |

Fig. 4

METHOD AND SYSTEM FOR ASSIGNMENT OF RECLAIM VECTORS IN A PARTITIONED CACHE WITH A VIRTUAL MINIMUM PARTITION SIZE

BACKGROUND OF THE INVENTION

1. Technical Field

This invention relates to computer storage of information and, more particularly, to a method of assigning reclaim vectors in a partitioned cache with dynamic resource allocation.

2. Description of the Related Art

A computer system typically includes an information processor coupled to a hierarchical staged storage system. The type of storage employed in each staging location relative to the processor is normally determined by balancing requirements for speed, capacity, and cost. Computer processes continually refer to this storage over their executing lifetimes, both reading from and writing to the staged storage system. These references include self-referencing as well as references to every type of other process, overlay or data. It is well-known in the art that data storage devices using high-speed random access memory (RAM) can be referenced orders of magnitude faster than high volume direct-access storage devices (DASD's) using rotating magnetic media. Such electronic RAM storage typically relies upon high-speed transfer of electrical charges over short distances while DASD's typically operate mechanically by rotating a data storage position on a magnetic disk with respect to read-write heads. The relative cost per bit of storage for DASD and RAM makes it necessary to use DASD for bulk storage and electronic RAM for processor internal memory and caching.

In a multi-echelon staged memory system, a cache is typically placed between a processor and a larger but slower memory device. For instance, caches employing appropriate devices are found between a processor and main memory and between main memory and a DASD. The caching technique arose from the observation that processors frequently cluster their references in time and space to small sub-sets of all data stored. Thus, if 80% of the immediate references are to 5% of the data space, then storing that popular 5% in cache significantly decreases average reference time because of the substantial access speed advantage of cache over main storage. The fundamental caching problem involves establishing an efficient scheme for allocating cache spatial and temporal resources among multiple concurrent processes and their referenced data.

When data referenced by a process is found in the cache memory, it is a "hit" and a copy of the requested data is sent to the requesting process. When the desired data is not found, it is a "miss" and the requested data is read from the larger, slower main storage device and transferred both to cache and to the requesting process. When the "miss" data is added to cache, it replaces selected data already in cache. When the replaced data is selected according to the Least Recently Used (LRU) algorithm, the cache is referred to as an LRU cache.

A partitioned cache is one whose storage is divided into separate domains or partitions. Data with similar performance requirements are put into the same partition. The reason for this is to isolate the effects of managing high performance data from low performance data and vice versa. This allows a greater range of data to be effectively managed by a single cache. It may be implemented as a software cache in main memory or as a hardware cache, for example in the disk drive controller. A partitioned cache is of a fixed size, but the size of the partitions that make up the cache may vary through a process of dynamic reallocation of memory. These dynamic caches are controlled by a program operating on a processor or controller. Such caches employ some method of determining optimal partition sizes and shifting resources between the partitions to achieve the optimum size as it is updated. For example, this optimization may be based on the hit/miss ratio performance of each partition. Other partitioned caches statically allocate resources to each partition and avoid the problems inherent in dynamic reassignment of cache resources.

The cache resource used to store information from a single page is called a frame. When a frame is reallocated, the page of data it contains is dropped so that the frame can be utilized to store information for a different page associated with a different partition. This "stealing" of a frame typically occurs when a partition has a page cache miss reference. During a read or write operation to the cache, a miss occurs when data for the page being written does not already exist in the cache. Essentially, when a frame must be stolen to complete a cache access, a steal policy determines from which partition to steal the frame. The act of stealing a frame from one partition to be used in another, shifts cache resources among the partitions and accomplishes the dynamic reassignment to achieve the optimum size.

A method of establishing such a steal policy which minimizes the logic executed during a cache miss is to establish reclaim vectors for each partition. A reclaim vector for a partition is a list of numbers, wherein each number indicates how many frames should be stolen from a corresponding partition. As frames are stolen from other partitions, the reclaim vector is iteratively reduced to reflect the stolen pages.

Most methods of dynamically determining optimal sizes for partitions rely on periodically examining the performance of the cache and making adjustments. The period between the examinations is called a management interval. In a partitioned cache that dynamically assigns resources among the partitions through the use of a steal policy controlled by reclaim vectors, a new set of reclaim vectors is set for each management interval.

When a partition does not have a reclaim vector or it has stolen enough pages to reduce its reclaim vector to contain only zeros and then a miss is generated for it, a page is stolen from the same partition to satisfy the request. Such partitions do not grow but may shrink depending on the reclaim vectors in effect for the other partitions.

At some point, it may be desirable to allow a partition to shrink to the point where it is not using any pages. This allows the resources of the cache to be fully utilized. However, when a partition is empty, or full of changed pages, then a cache-full condition will result unless there is a non-zero reclaim vector in effect for the partition.

A little used cache partition will have a very low optimum size. Thus, it is likely for cache-full conditions to occur when little used cache partitions become active between management intervals. Since cache-full conditions are very disruptive to cache performance, it would be desirable to provide a method of avoiding the cache-full condition during the current management interval.

SUMMARY OF THE INVENTION

A method and system for avoiding a cache-full condition in an LRU organized, data set partitioned, page oriented cache of a defined capacity intercoupling a processor to an external storage subsystem is provided. The processor is capable of storing pages of a data set into a plurality of cache partitions. The method comprises the steps of periodically determining the target size of each partition for optimal partitioning, and assigning a reclaim vector to each partition specifying the number of frames to be stolen from each of the other partitions necessary to achieve the corresponding target size. If the target size of a particular partition is less than the partition's virtual minimum size, the method adjusts that partition's reclaim vector to enable the partition to steal sufficient frames from other partitions to achieve the virtual minimum size. In response to a cache miss, frames are stolen from other partitions, as directed by the reclaim vector of the partition storing the data set to which the missing page reference is a member, by removing the lowest page in LRU order and adding the resulting frame to the storing partition and modifying the storing partition's reclaim vector.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a table showing an example of assigned reclaim vectors in a partitioned cache with dynamic resource allocation according to the present invention.

DETAILED DESCRIPTION OF PREFERRED EMBODIMENT

Figure 1:
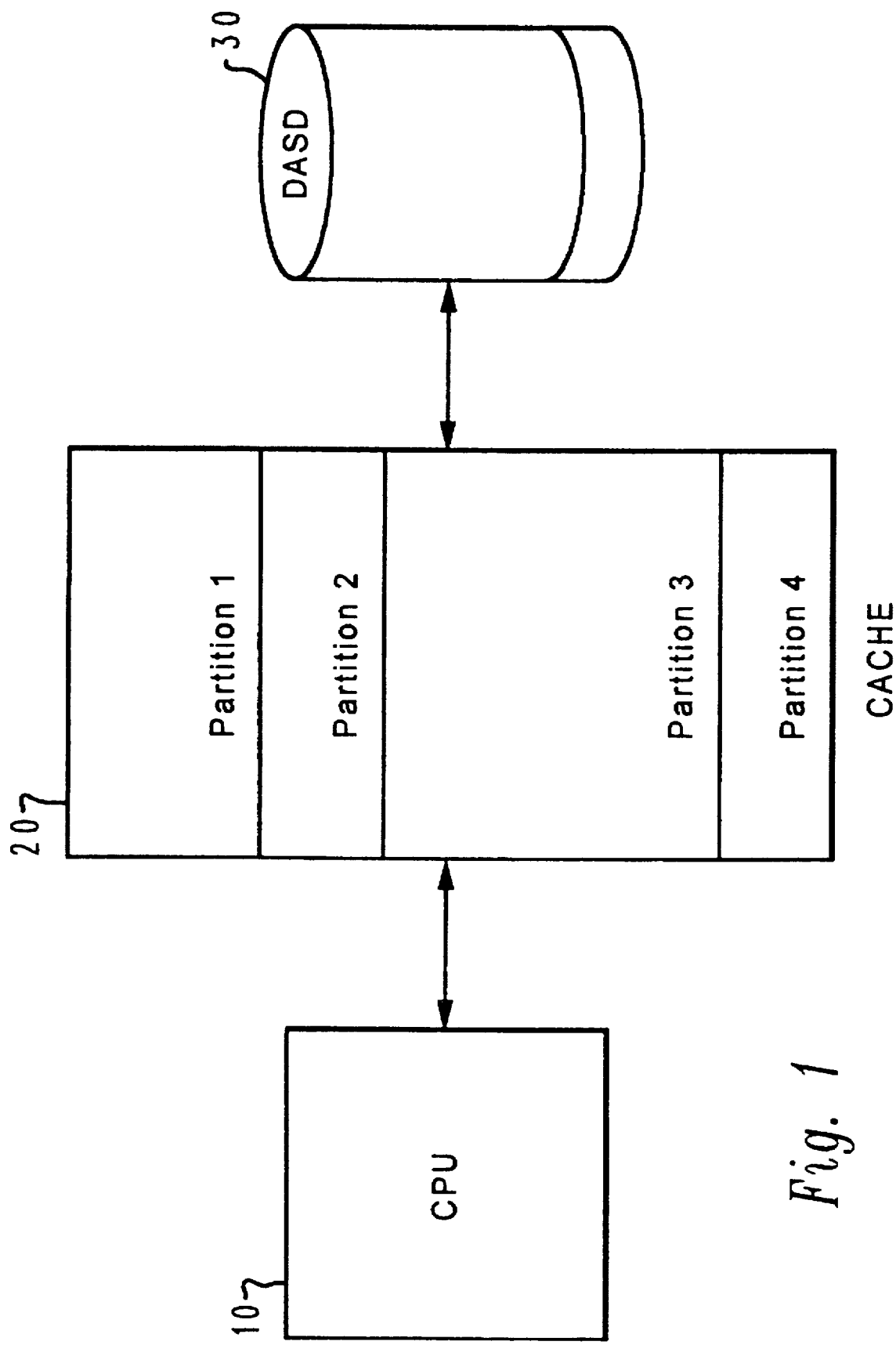
FIG. 1 graphically depicts a data processing system having a partitioned cache intercoupling a processor and a data storage device.

Dynamic reallocation of partition memory is implemented in a data processing system as depicted in FIG. 1. The processor (CPU) 10 is capable of running one or more computer processes. Data and code required to run processes on CPU 10 is contained in the high volume direct-access storage device (DASD) 30. Partition cache 20 is a high-speed memory device intercoupling CPU 10 with DASD 30. Partition cache 20 is a buffer storage, smaller and faster than disk storage, used to hold a copy of instructions and data obtained from main storage and likely to be needed next, and which have been obtained automatically from main storage. The storage in cache 20 is divided into separate domains. Data with similar performance requirements are put into the same domain or partition.

Cache 20 allows dynamic reassignment of resources within the partitioned cache. Dynamic resource allocation is accomplished through a method implemented by CPU 10.

The method periodically determines what the optimum size for each of the four partitions in cache 20 should be to best carry out a caching policy. This optimum size is determined by examining the performance of the cache and making adjustments to maintain or enhance that performance. This optimum size is then used as a target size for the partition in the following management interval.

Any desired methodology can be used to determine the target size for each partition. For example, Smith, U.S. Pat. No. 5,394,531, incorporated herein by reference, discloses an algorithm which determines how to redistribute the amount of cache allocated to each partition such that the overall read hit ratio performance, within the constraint presented by a weighted prioritization of the partitions, is maximized by dynamically allocating cache resources in proportion to the signed different between an assigned and actual hit/miss ratio. Since any desired technique can be used, the details are not important to the present invention.

The method continues by specifying reclaim vectors necessary to achieve the target sizes. A reclaim vector is assigned to each partition and contains a list of numbers. Each number indicates how many frames should be stolen from a corresponding partition. The total number of frames specified by the reclaim vector is equal to the amount necessary to achieve that partition's target size.

As an example of how a reclaim vector is set, assume a cache has four partitions and that the optimization algorithm determines that partition 1 should contain 100 more frames than it currently does. Further, an assignment algorithm determines that 50 of these frames should come from partition 2 and 50 should come from partition 3. The reclaim vector which should be set for partition 1 then should look like this (0 50 50 0)

The steal process uses the reclaim vector for a partition not only as a means of determining where to get more frames for a partition, but also as a way of keeping track of how many frames need to be acquired.

Continuing with the reclaim vector just described, suppose a cache write operation to partition 1 generates a cache miss and a frame is stolen from partition 2 to satisfy it. The steal process would update the reclaim vector described above and the result would look like this (0 49 50 0)

indicating that only 49 more frames should be stolen from partition 2 to satisfy misses. When a reclaim vector contains only zeros, then misses generated by its associated partition are satisfied by stealing a frame from that partition. In our example, after partition 1 has grown by stealing 50 frames from partition 2 and 50 frames from partition 3, its reclaim vector will look like this (0 0 0 0)

At this point, a miss generated by partition 1 would be satisfied by stealing a frame used to store some other page in partition 1 (i.e. reusing a frame). So, once the steal process has depleted a reclaim vector for a partition, that partition will no longer grow in size. Also, note that this partition may shrink if other reclaim vectors allow frames to be stolen from partition 1 and these partitions experience cache misses.

An obvious and straight forward method for setting, or assigning, reclaim vectors would be to assign vectors in proportion to the relative gain or loss of each partition. Thus, the proportional method would proceed as follows:

Let $s_i$ be the number of frames that partition i needs to lose because of shrinkage. If partition i is not shrinking (i.e. it is staying the same size or growing), then $s_i$ is zero.

Let $g_i$ be the number of frames that partition i will gain due to growth. If partition i is not growing (i.e. it is staying the same size or shrinking), then $g_i$ is zero.

Let M be the number of pages moving from one partition to another. Note that since the total number of pages in the cache remains constant, we have the following relation:

$$\sum_i s_i = \sum_i g_i = M$$

If M is zero, then each partition gets a reclaim vector of all zeros. Otherwise, for each partition, j, define the ith position of its reclaim vector, $r_{ji}$ as:

$$r_{ji} = s_i \left( \frac{g_j}{M} \right)$$

Therefore, the reclaim vector for the jth partition will allow $r_{ji}$ frames to be stolen from the ith partition. A more complex method of assigning reclaim vectors has been disclosed by Elko et al., U.S. Pat. No. 5,457,793, incorporated herein by reference.

As an example of the proportional method of assigning reclaim vectors as described above, suppose cache 20 has a 200 page capacity equally divided between the four partitions. The method implemented on CPU 10 sets the target size of partition 2 at 140 and the target size of partition 3 at 60 pages, leaving partitions 1 and 4 empty. Using the proportional method for assigning reclaim vectors, the resulting set of reclaim vectors would be:

| Partition | Reclaim Vector |
|---|---|
| 1 | (0 0 0 0) |
| 2 | (45 0 0 45) |
| 3 | (5 0 0 5) |
| 4 | (0 0 0 0) |

If the above reclaim vectors are used in a partitioned cache with dynamic resource allocation, it would be likely for a cache-full condition to occur when little used cache partitions such as partitions 1 and 4 become active between management intervals. In the example shown above, a cache miss in partition 4 after partitions 2 and 3 have stolen its' frames results in a cache-full condition since the reclaim vector for partition 4 contains no non-zero entries. This will occur until the next management interval when the reclaim vectors will be reset. At that time, the change in activity for partition 4 will cause a change in its estimated optimal size and a suitable reclaim vector will be set for it.

One approach to solve this problem of a cache-full condition might be to never let partitions shrink to a size less than some minimum. This is a simple solution, but is has the unwelcomed drawback of always over-allocating resources to any unused partitions. It is desirable to allow a partition to shrink to the point where it is not using any pages. This allows the resources of the cache to be fully utilized.

The present invention solves the cache-full condition problem by introducing the concept of a virtual minimum size for each partition. The method of assignment of reclaim vectors according to the present invention requires that each partition be allowed to grow to at least the virtual minimum size for that partition regardless of its target size. In practice, as described below, the introduction of a virtual minimum size still allows partitions to become empty or very low. However, such a partition will have been assigned a reclaim vector which will allow it to achieve a virtual minimum size in the event that resources are required, thereby, avoiding a cache-full condition.

The virtual minimum size (or sizes) chosen for cache 20 will vary according to a multitude of factors including efficiency and performance tradeoffs and the particular configuration of the data processing system. Typically, the virtual minimum size will be set large enough for the partition to accommodate fluxuations in its expected work load until the end of the current management interval. Moreover, a different virtual minimum size may be assigned to each partition, if necessary.

Figure 2:
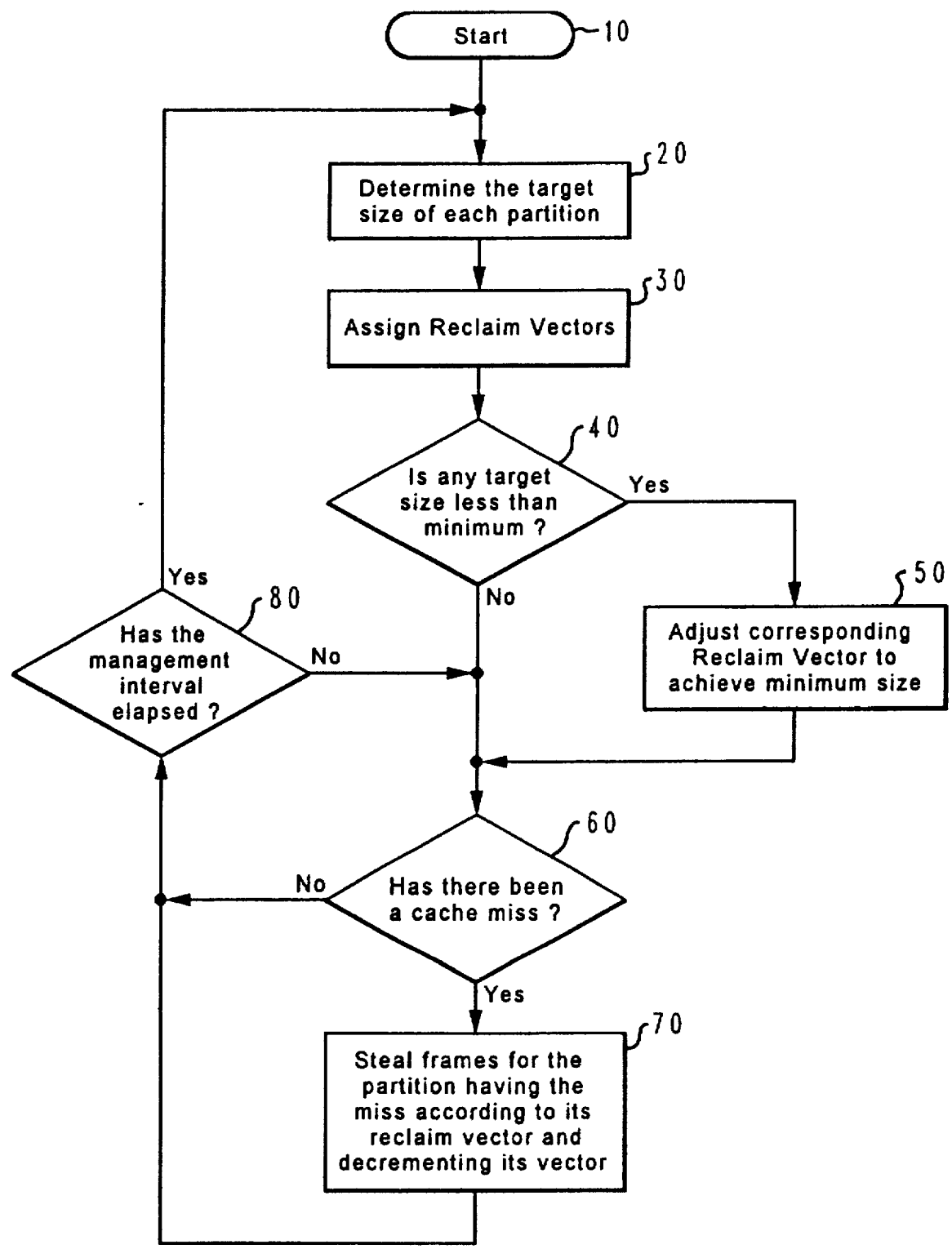
FIG. 2 is a process flow diagram of dynamic resource allocation according to the present invention.

Referring now to FIG. 2, there is shown a flow diagram of dynamic resource allocation in a partitioned cache according to a preferred embodiment of the present invention. The method starts at step 10. At step 20, the target size for each partition is determined for optimal partitioning as defined by an optimization algorithm. For example, target sizes may be set so as to maximize overall read hit ratios for each of the partitions as was shown in Smith. At step 30, reclaim vectors are then assigned as specified by the steal policy algorithm. For example, the steal policy may define a method of proportionally assigning reclaim vectors. Each reclaim vector specifies the number of frames to be stolen from each of the other partitions necessary to achieve the target size of the corresponding partition.

At step 40, the method determines whether a target size for any particular partition is less than the virtual minimum size for that partition. If the answer is YES, the method proceeds to step 50 where the reclaim vector corresponding to the less-than-virtual minimum targeted partition is adjusted so that the partition may achieve at least the virtual minimum size. When adjusting reclaim vectors the following three rules are applied:

(1) For a partition shrinking to a size less than the virtual minimum, build a reclaim vector from the frames that are being stolen from it by partitions whose current size is at least the virtual minimum, wherein the current size is the number of frames actually in a partition and a shrinking partition is a partition whose target size is less than or equal to its current size;

(2) For any other partition whose target size is less than its virtual minimum, build a reclaim vector (or augment one already built) with frames from the partitions growing whose current size is at least the virtual minimum, wherein a growing partition is a partition whose target size is greater than its current size;

(3) At any time, if unable to obtain enough frames from growing partitions, then use pages from any partition whose current size is at least the virtual minimum.

As a example, when the above heuristics are applied to the set of reclaim vectors derived in the previous example and using a virtual minimum size of 10, we obtained

| Partition | Reclaim Vector |
|---|---|
| 1 | (0 9 1 0) |
| 2 | (45 0 0 45) |
| 3 | (5 0 0 5) |
| 4 | (0 9 1 0) |

Note that partitions 1 and 4 now have reclaim vectors that will allow them to take back some of the pages stolen from them by partitions 2 and 3 and grow to virtual minimum size.

Referring again to FIG. 2, after adjusting reclaim vectors at step 50 or after a NO decision at step 40, the method proceeds to step 60 where a decision is made whether there has been a cache miss for any of the cache partitions. Responsive to each page cache miss reference at decision block 60, the method proceeds to step 70. At step 70 one or more frames are stolen from other partitions as is directed by the reclaim vector of the partition storing the data set to which the missed page reference is a member. The resulting frames are added to the storing partition so that the write operation to the cache may be completed. The storing partition's reclaim vector is then decremented in the corresponding column to reflect the frame stolen from the other partition.

After completing step 70 or if decision block 60 produces a "NO" decision, the method proceeds to step 80. There is it determined whether the management interval has elapsed. Depending upon various optimization and design considerations, this interval may be milliseconds or tens of seconds. If the management interval has not elapsed the method returns to step 60. If the management interval has elapsed the method returns to step 20. In an actual implementation, the code implementing the method does not actually continuously loop, instead typically being invoked only upon the occurrence of an interrupt indicating a cache miss.

Figure 3:
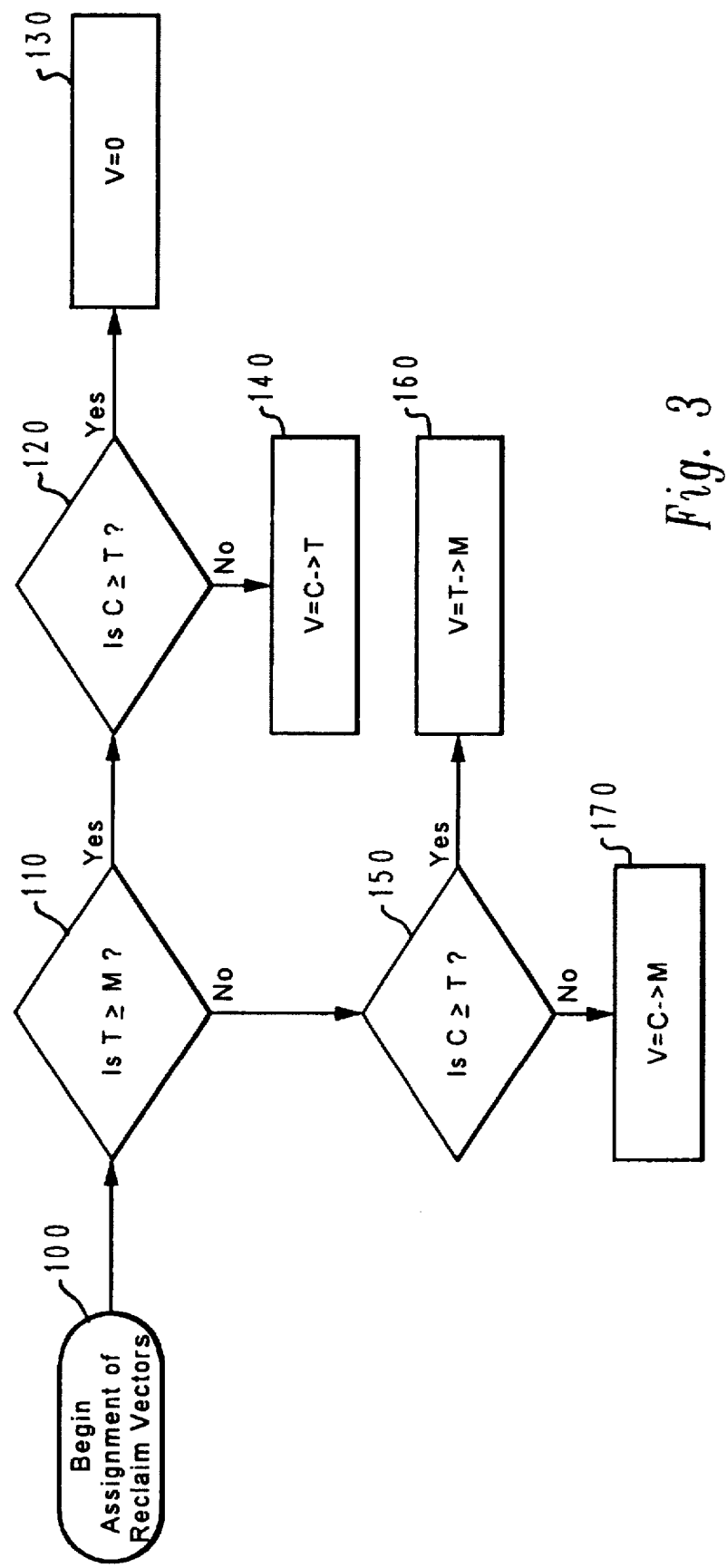
FIG. 3 is a process flow diagram of the assignment of reclaim vectors requiring a minimum partition size according to a preferred embodiment of the present invention.

Referring now to FIG. 3, there is depicted a flow diagram of a method for assigning reclaim vectors using a virtual minimum size according to the present invention. The process begins at step 100. The process proceeds to decision block 110 where it is determined whether the target size (T) is greater than or equal to the virtual minimum size (M). If affirmative, the process proceeds to decision block 120. This is a case where the target size is greater than the virtual minimum size and so there is very little concern that the partition will reach a cache-full condition during the management interval. Decision block 120 determines whether a partition's current size (C) is greater than or equal to the target size (T). If it is, the partition is assigned a reclaim vector of zero as shown at step 130. Here there is no need to adjust the reclaim vector to achieve the partition's virtual minimum size because the steal policy will never allow other partitions to steal more frames from the partition than it has to meet the virtual minimum size. If decision block 120 results in a negative response, a reclaim vector (V) which allows the partition to steal sufficient frames to grow from its current size to its target size is assigned at step 140. Since the target size is greater than the virtual minimum size, no adjusting of the reclaim vector is required.

Thus, if the target size is greater than the virtual minimum size for a partition, a reclaim vector will be assigned to that partition which directs that frames be stolen in an amount equivalent to the greater of the difference between the target size and the current size, and zero. This is shown in the flow diagram since a negative difference between the target size and the current size implies that the current size is greater than the target size. In such a case, decision block 120 will assign a reclaim vector of zero at step 130. However, if the difference between the target size and the current size is positive, the current size is less than the target size and the reclaim vector will be assigned an amount necessary to achieve the target size at step 140 (i.e. the reclaim vector will be non-zero).

If the decision at step 110 is that the target size is less than the partition's virtual minimum size, the method proceeds to decision block 150. If the partition's current size is greater than or equal to the target size, other partitions will be allowed to steal frames from this partition in an amount equal to the difference between the current size and the target size. Thus, at any time that this partition has increased activity during the management interval, its number of available frames will be between the target size and the current size. Thus, at step 160 it is assigned a reclaim vector allowing it to steal sufficient frames to increase from the target size to its virtual minimum size. This will allow it to achieve a size equal to or greater than its virtual minimum size.

On the other hand, if decision block 150 determines that the current size is less than the target size, the process proceeds to step 170 where a reclaim vector is assigned providing sufficient frames for the partition to steal so that it may grow from its current size to the virtual minimum size. This is necessary because at any time during the management interval a cache miss may occur in this partition, so the partition must have the ability to grow not only to its target size but beyond to its virtual minimum size.

Thus, it can been seen that if the target size is less than the virtual minimum size for a partition, a reclaim vector is assigned to that partition which directs frames be stolen in an amount equivalent to the greater of the difference between its virtual minimum size and the target size or the difference between its virtual minimum size and the current size.

Referring now to FIG. 4, there is provided a table showing an example of assigned reclaim vectors in a partitioned cache with dynamic resource allocation according to the present invention. There are four columns representing four separate partitions within a partitioned to cache. The rows represent six consecutive management intervals. For purposes of this example, a cache with 100,000 pages is used and the virtual minimum partition size is chosen to be 1,000 for each partition. As an illustrative example, consider interval 6. Partitions 2 and 4 are both shrinking to sizes less than the minimum. However, they are both assigned reclaim vectors which allow them to grow from their target size to the virtual minimum size. Partitions 1 and 3 are both growing from their current size to a larger target size and so they have been assigned reclaim vectors which allow them to achieve the target.

In interval 4, partition 4 is growing from a current size of 750 to a target size of 900. However, because the target size is less than the virtual minimum size, the reclaim vector assigned is sufficient to grow partition 4 to a size of 1,000. Partitions 1 and 2 are both growing and so have been assigned reclaim vectors providing sufficient frames to achieve the target size. Partition 3 is shrinking and so its' reclaim vector is set to zero. Notice that although partition 3 may not steal frames from other partitions, the steal policy has only allowed partitions 1, 2 and 4 to steal enough frames from partition 3 for it to be reduced to its target size, but no more.

In summary, the present invention describes a method of setting reclaim vectors used to establish a steal policy in a partition cache utilizing dynamic resource allocation. The present invention assigns reclaim vectors such that, although a partition may have its available frames reduced below a virtual minimum, a partition is always able to steal sufficient frames from other partitions to achieve a virtual minimum size. In this way, the present invention avoids the problem of a cache-full condition that occurs with little used or empty partitions in prior art dynamic resource allocation systems.

While the invention has been particularly shown and described with reference to a preferred embodiment, it will be understood by those skilled in the art that various changes in form and detail may be made therein without departing from the spirit and scope of the invention.

I claim:

1. A method for avoiding a cache full condition in a dataset partitioned, page oriented cache of a defined capacity having dynamic resource allocation and intercoupling a processor to an external storage subsystem, said processor including means for storing pages of a dataset into a plurality of cache partitions, comprising the steps of:

(a) periodically determining the target size of each partition for optimal partitioning;

(b) assigning a reclaim vector to each partition specifying the number of frames to be stolen from each of the other partitions necessary to achieve a corresponding target size;

(c) if the target size of a particular partition is less than the partition's virtual minimum size, adjusting that partition's reclaim vector to enable the partition to steal sufficient frames from other partitions to achieve the virtual minimum size; and (d) responsive to one or more page cache miss references, stealing one or more frames from other partitions, as directed by the reclaim vector of the partition storing the dataset to which the missed page reference is a member, and adding the resulting frame to the storing partition, and modifying the storing partition's reclaim vector to reflect the pages stolen.

2. A method according to claim 1, wherein, if the target size is also less than the current size, the step of adjusting comprises adjusting the reclaim vector to enable the partition to steal sufficient frames from other partitions to progress from the target size to the partition's virtual minimum size.

3. A method according to claim 2, wherein the reclaim vector is modified to steal frames from partitions whose current size is at least the virtual minimum.

4. A method according to claim 3, wherein, if unable to obtain enough frames from partitions whose current size is at least the virtual minimum size but less than the target size, frames are stolen from any partition whose size is at least the virtual minimum size.

5. A method according to claim 1, wherein, if the target size is also greater than the current size, the step of adjusting comprises adjusting the reclaim vector to enable the partition to steal sufficient frames from other partitions to progress from the current size to the partition's virtual minimum size.

6. A method according to claim 5, wherein the reclaim vector is adjusted to steal frames from partitions whose current size is at least the virtual minimum size but less than the target size.

7. A method according to claim 6, wherein, if unable to obtain enough frames from partitions whose current size is at least the virtual minimum size but less than the target size, frames are stolen from any partition whose size is at least the virtual minimum size.

8. A method according to claim 1, wherein each partition has the same virtual minimum size.

9. A method according to claim 1, wherein, in the step of adjusting, each reclaim vector is adjusted such that each partition can steal sufficient frames to achieve that partition's minimum size from only those partitions which stole frames from it.

10. A method according to claim 1, wherein the step of stealing is performed by removing the lowest page in LRU order.

11. A method for dynamically reallocating resources among partitions in a dataset partitioned, page oriented cache of a defined capacity intercoupling a processor to an external storage subsystem, said processor including means for storing pages of a dataset into a plurality of cache partitions, comprising the steps of:

(a) comparing a target size with a virtual minimum size for each partition;

(b) if the target size is less than the virtual minimum size for a partition, assign a reclaim vector to such partition which directs that frames be stolen in an amount equivalent to the greater of the difference between the minimum size and the target size or the difference between the minimum size and the current size; and (c) stealing frames in accordance with the assigned reclaim vectors in response to predetermined events.

12. A method according to claim 11, wherein a predetermined event is a cache miss reference.

13. A method according to claim 11, further comprising the step of, if the target size is greater than the virtual minimum size for a partition, assigning a reclaim vector to such partition which directs that frames be stolen in an amount equivalent to the greater of the difference between the target size and the current size, and zero.

14. A data processing system for avoiding a cache full condition in a dataset partitioned, page oriented cache of a defined capacity having dynamic resource allocation and intercoupling a processor to an external storage subsystem, said processor, comprising the steps of:

a direct access storage device;

a processor includes means for storing pages of a dataset into a plurality of cache partitions in said partitioned cache;

a dataset partitioned, page oriented cache of a defined capacity and having a plurality of partitions, capable of dynamic resource allocation, and intercoupling the direct access storage device and the processor; and a controller for:
  periodically determines the target size of each partition for optimal partitioning;
  assigning a reclaim vector to each partition specifying the number of frames to be stolen from each of the other partitions necessary to achieve a corresponding target size;
  if the target size of a particular partition is less than the partition's virtual minimum size, adjusting that partition's reclaim vector to enable the partition to steal sufficient frames from other partitions to achieve the virtual minimum size; and
  responsive to one or more page cache miss references, stealing one or more frames from other partitions, as directed by the reclaim vector of the partition storing the dataset to which the missed page reference is a member, and adding the resulting frame to the storing partition, and modifying the storing partition's reclaim vector to reflect the pages stolen.

15. A system according to claim 14, wherein the controller is the processor.

* * * * *